United States Patent
Tosaka et al.

(10) Patent No.: US 12,466,946 B2
(45) Date of Patent: Nov. 11, 2025

(54) METHOD FOR PRODUCING FRP PRECURSOR

(71) Applicant: Resonac Corporation, Tokyo (JP)

(72) Inventors: Yuji Tosaka, Tokyo (JP); Takeshi Saitoh, Tokyo (JP); Masaki Yamaguchi, Tokyo (JP); Tetsuro Iwakura, Tokyo (JP); Yuichi Shimayama, Tokyo (JP); Kosuke Murai, Tokyo (JP); Masashi Oji, Tokyo (JP)

(73) Assignee: RESONAC CORPORATION, Tokyo (JP)

(*) Notice: Subject to any disclaimer, the term of this patent is extended or adjusted under 35 U.S.C. 154(b) by 117 days.

(21) Appl. No.: 18/025,456

(22) PCT Filed: Sep. 10, 2021

(86) PCT No.: PCT/JP2021/033402
§ 371 (c)(1),
(2) Date: Mar. 9, 2023

(87) PCT Pub. No.: WO2022/054928
PCT Pub. Date: Mar. 17, 2022

(65) Prior Publication Data
US 2023/0323108 A1    Oct. 12, 2023

(30) Foreign Application Priority Data
Sep. 11, 2020   (JP) .................... 2020-153144

(51) Int. Cl.
*C08L 63/00* (2006.01)
*B29B 11/04* (2006.01)
(Continued)

(52) U.S. Cl.
CPC ............ *C08L 63/00* (2013.01); *B29B 11/04* (2013.01); *B29B 11/16* (2013.01); *C08J 5/18* (2013.01);
(Continued)

(58) Field of Classification Search
None
See application file for complete search history.

(56) References Cited

U.S. PATENT DOCUMENTS 11,566,117 B2 *   1/2023   Ochi ................. B29C 70/20
2018/0345539 A1 * 12/2018   Tosaka ............... B29D 7/01

FOREIGN PATENT DOCUMENTS

| JP | 58-71123 A | 4/1983 |
| JP | 2007-176169 A | 7/2007 |

(Continued)

OTHER PUBLICATIONS

Scientific Systems Research Group, 2006 Science and Technology Computing Subcommittee Materials (Oct. 5, 2006), Hisashige Ando, Trends in Semiconductor Technology and Computer Technology.

(Continued)

*Primary Examiner* — Barbara J Musser
(74) *Attorney, Agent, or Firm* — FITCH, EVEN, TABIN & FLANNERY, LLP (57) ABSTRACT

Provided is a production method of an FRP precursor. The method includes: a pre-coating step of applying a resin varnish having a filler content of 5 vol % or less in a solid content thereof, to a sheet-shaped aggregate, and a melt-pasting step of melt-pasting a pair of resin films, each having a filler content of 30 vol % or more, to both surfaces of the aggregate, after the pre-coating step.

19 Claims, 2 Drawing Sheets

(51) Int. Cl.
    *B29B 11/16*    (2006.01)
    *B29K 101/10*    (2006.01)
    *B29K 105/16*    (2006.01)
    *C08J 5/18*    (2006.01)

(52) U.S. Cl.
    CPC ...... *B29K 2101/10* (2013.01); *B29K 2105/16* (2013.01); *C08J 2363/00* (2013.01); *C08J 2463/00* (2013.01)

(56) References Cited

FOREIGN PATENT DOCUMENTS

| | | |
|---|---|---|
| JP | 2008-31405 A | 2/2008 |
| WO | 2016/178399 A1 | 11/2016 |
| WO | 2016/178400 A1 | 11/2016 |
| WO | 2020/040150 A1 | 2/2020 |

OTHER PUBLICATIONS

Spherical-Silica Fine Particles QSG Series, Shin-Etsu Chemical Co., Ltd., Jul. 31, 2015, https://silicone.jp/catalog/pdf/QSGseries.pdf., column of general characteristics, [retrieved on Oct. 27, 2021], Internet, column of general characteristics (cited in an International Search Report dated Nov. 16, 2021 in corresponding Appln. No. PCT/JP2021/033402).

High-purity synthesis spherical silica, Admatechs Co., Ltd., Apr. 19, 2016, https://www.admatechs.co.jp/productadmafine-silica.html, column of particle size lineup, [retrieved on Oct. 27, 2021], Internet, column of particle size lineup (cited in an International Search Report dated Nov. 16, 2021 in corresponding Appln. No. PCT/JP2021/033402).

\* cited by examiner

METHOD FOR PRODUCING FRP PRECURSOR

CROSS-REFERENCE TO RELATED APPLICATIONS

This application is a U.S. national phase application filed under 35 U.S.C. § 371 of International Application No. PCT/JP2021/033402, filed Sep. 10, 2021, designating the United States, which claims priority from Japanese Application No. 2020-153144, filed Sep. 11, 2020, which are incorporated herein by reference in their entireties.

TECHNICAL FIELD

The present disclosure relates to a method of producing an FRP precursor.

BACKGROUND ART

Fiber reinforced plastic (FRP) is a composite material using a high elastic-modulus material, such as fiber, as an aggregate, in which the aggregate is incorporated into a base material (matrix) such as plastic in order to improve the strength. The FRP is an inexpensive, light, and highly durable composite material that takes advantage of weather resistance, heat resistance, and chemical resistance.

While taking advantage of these performances, the FRP is used in a wide range of fields. For example, the FRP has formability and high strength, and thus is used as a structural material for housing equipment, ships, vehicles and aircrafts. Further, while taking advantage of an insulation property, the FRP is also used in the field of electronic components such as electric devices and semiconductor chips.

As the integration density of electronic components such as semiconductor chips highly increases, printed wiring boards for mounting also become narrower. Although the amount of heat generated by semiconductor chips itself is small, the heat density per unit area has become extremely high due to mounting in a dense state (see, for example, Non-PTL 1). In order to dissipate generated heat, a cooling method with a cooling fan or heat radiation fins is adopted, but attachment of these components causes a problem of an increase of a device size. In particular, since wearable electronic devices are required to be short, small, light, and thin, it is difficult to adopt a cooling method with a cooling fan or heat radiation fins. Therefore, the present applicant has previously suggested a method of increasing the thermal conductivity of a printed wiring board so as to diffuse the generated heat throughout a device, through the printed wiring board (see PTL 1).

In order to increase the thermal conductivity of a printed wiring board, a method of highly filling an FRP precursor, such as a prepreg, with a filler having a higher thermal conductivity than resin is often adopted. However, high filling of a filler and the like deteriorates impregnability of a resin composition into an aggregate such as a woven glass fabric, and thus, there is a risk that the insulation property and the heat resistance may be deteriorated. Further, a filler may settle within an impregnation container during application of the resin composition to the aggregate so that it becomes not possible to apply the resin composition containing a desired amount of filler, to the aggregate.

Thus, a method may be adopted in which resin varnish to be used is applied on a carrier film and is dried so as to form a resin film, and then, the resin film is laminated on the aggregate under heating and pressurization conditions (see, e.g., PTL 2). In this method, settling of the filler and the like hardly occurs during lamination, and then it becomes possible to laminate the resin film containing a desired amount of filler, to the aggregate.

CITATION LIST

Patent Literature

PTL 1: JP 2008-031405A
PTL 2: JP 2007-176169A

Non Patent Literature

Non-PTL 1: Scientific Systems Research Group, 2006 Science and Technology Computing Subcommittee Materials (Oct. 5, 2006), Hisashige Ando, Trends in Semiconductor Technology and Computer Technology

SUMMARY OF INVENTION

Technical Problem

The method using the resin film, which is described in PTL 2, handles those having a lower liquidity than a method of applying resin varnish, and thus, when the resin film is laminated on, for example, a glass cloth, a care is needed to sufficiently impregnate spaces between filaments of yarns constituting the glass cloth, with resin. However, during lamination, sometimes, the yarns exerted the action effect of a filter cloth, so that spaces between the filaments of the yarns were impregnated with only resin, and the filler agglomerated on the surfaces of the yarns, like filtration residue. In such a case, it was found that the ratio of the filler in the resin layer near the surface of the glass cloth was locally increased, resulting in high viscosity and poor liquidity, and thus deterioration of moldability during lamination.

Therefore, an object of the present disclosure is to provide a method of producing an FRP precursor, in which impregnation of a resin is performed up to voids of an aggregate, but the ratio of a filler is suppressed from being locally increased in a method using a resin film.

Solution to Problem

As a result of intensive studies, the present inventors have found that the above objects can be achieved by the production method of the FRP precursor of the present disclosure.

The present disclosure includes the following embodiments [1] to [8].

[1] A method of producing an FRP precursor, which includes:
  pre-coating a resin varnish having a filler content of 5 vol % or less in a solid content thereof, to a sheet-shaped aggregate; and
  melt-pasting a pair of resin films, each having a filler content of 30 vol % or more, to both surfaces of the aggregate, after the pre-coating.

[2] The FRP precursor production method described in [1], in which in the pre-coating, an amount of the resin varnish to be used satisfies the following formula (1).

$$0.05 \leq \frac{\text{Volume of solid content of applied resin varnish}}{\text{Bulk volume of aggregate} - \text{True volume of aggregate}} \leq 0.6 \quad (1)$$

[3] The FRP precursor production method described in [1] or [2], in which the melt-pasting includes the following film pressure-welding.

The film pressure-welding; is obtaining the FRP precursor in which under normal pressure, in one resin film between the paired resin films, between both surfaces, a surface on the aggregate side, i.e., one aggregate-side film surface, is pressure-welded to one of both surfaces of the aggregate, whereas in the other resin film between the paired resin films, between both surfaces, a surface on the aggregate side, i.e., the other aggregate-side film surface, is pressure-welded to the other of both surfaces of the aggregate.

[4] The FRP precursor production method described in [3], further including preheating the aggregate-side film surface, between both surfaces of the resin film, prior to the film pressure-welding.

[5] The FRP precursor production method described in [3] or [4], further including preheating both surfaces of the aggregate, prior to the film pressure-welding.

[6] The FRP precursor production method described in any one of [1] to [5], in which a bulk thickness of the aggregate is 30 μm or more.

[7] The FRP precursor production method described in any one of [1] to [6], in which an average particle size of a filler contained in the resin varnish is 0.1 to 10 μm.

[8] The FRP precursor production method described in any one of [1] to [7], in which the resin film is a thermosetting resin film.

Advantageous Effects of Invention

According to the production method of the FRP precursor of the present embodiment, even when the resin film is used, it is possible to impregnate even micro portions of the aggregate with the resin while suppressing the filler ratio from being locally increased. Thus, since there is no local increase in the ratio of the filler in the resin layer near the surface of the glass cloth, and there are no high viscosity and poor liquidity, it is possible to suppress deterioration of moldability during lamination. Therefore, while the improvement of thermal conductivity by the filler is promoted, moldability can also be ensured.

DESCRIPTION OF EMBODIMENTS

According to the present embodiment, a method of producing an FRP precursor includes:
pre-coating (hereinafter, for convenience, also referred to as a "pre-coating step") in which a resin varnish having a filler content of 5 vol % or less in the solid content thereof is applied to a sheet-shaped aggregate; and
melt-pasting (hereinafter, for convenience, referred to as a "melt-pasting step") in which after the pre-coating, a pair of resin films, each having a filler content of 30 vol % or more, is melt-pasted to both surfaces of the aggregate.

Here, in the present specification, like the pre-coating step and the melt-pasting step, for convenience, a predetermined operation may be referred to as an "XX step", but the XX step is not limited to only an embodiment specifically described in the present specification.

Hereinafter, with reference to FIG. 1 and FIG. 2, descriptions will be made on an embodiment of the production method of the FRP precursor according to the present embodiment, but the present embodiment is not limited to this embodiment.

Specifically, descriptions will be made using a pre-coating apparatus 100, and an FRP precursor producing apparatus 200 used after the pre-coating step (hereinafter, also simply referred to as an FRP precursor producing apparatus 200). The FRP precursor producing apparatus 200 will be described as an apparatus which uses a pair of resin films 54 in pasting on both surfaces of a sheet-shaped pre-coated aggregate 41.

The pre-coating apparatus 100 and the FRP precursor producing apparatus 200 are placed under normal pressure. Unlike in a case where vacuum lamination is adopted, since the present embodiment is performed under normal pressure, it is easy to cope with even a case where a manufacturing trouble occurs. The production method of the FRP precursor according to the present embodiment can be performed by using the pre-coating apparatus 100 and the FRP precursor producing apparatus 200.

Figure 1:
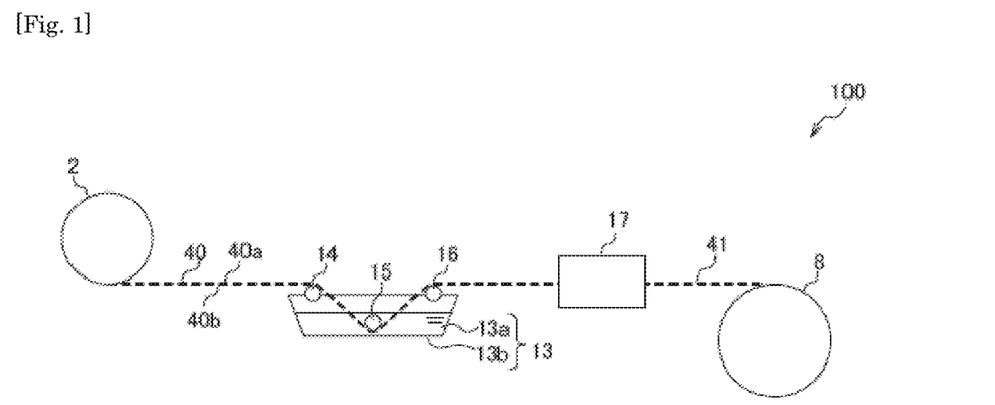
FIG. 1 is a conceptual view of an apparatus that may be used in a pre-coating operation in the production method of an FRP precursor according to the present embodiment.
Figure 2:
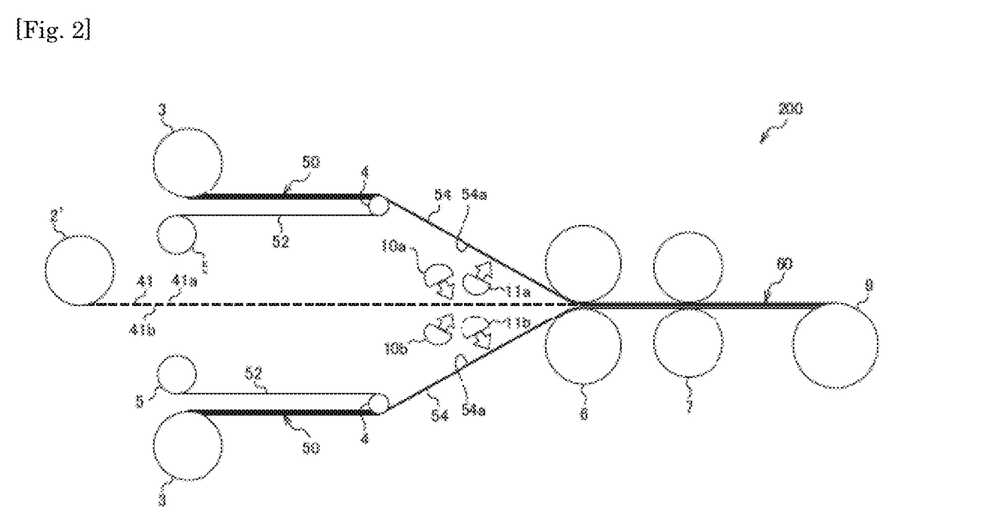
FIG. 2 is a conceptual view of an apparatus that may be used after pre-coating in the production method of the FRP precursor according to the present embodiment.

In FIG. 1 and FIG. 2, there is a "two-stage method" in which in the pre-coating apparatus 100, first, the pre-coated aggregate 41 is wound by a pre-coated aggregate winding device 8, and the wound aggregate 41 is used in the FRP precursor producing apparatus 200 used after the pre-coating step. However, a "single-stage method" may be adopted in which the pre-coated aggregate 41 is not wound by the pre-coated aggregate winding device 8 in the pre-coating apparatus 100 illustrated in FIG. 1, and is used, as it is, in the FRP precursor producing apparatus 200 used after the pre-coating step, which is illustrated in FIG. 2. Meanwhile, in the pre-coating apparatus 100 illustrated in FIG. 1, the coating speed can be increased, and the aggregate delivery speed can be made higher than that in the FRP precursor producing apparatus 200 illustrated in FIG. 2. Thus, it is desirable that the pre-coating apparatus 100 and the FRP precursor producing apparatus 200 are independent, that is, the two-stage method is preferred. In the two-stage method, using a plurality of FRP precursor producing apparatuses 200 greatly increases productivity.

Pre-Coating Step, Pre-Coating Apparatus 100; FIG. 1

As described above, the pre-coating step is a step in which a resin varnish having a filler content of 5 vol % or less in the solid content thereof is applied to a sheet-shaped aggregate 40. Here, the solid content in the present specification refers to a component in a composition, other than volatile substances such as water and organic solvent to be described below. That is, the solid content includes those in a liquid state, a syrup state, and a wax state at room temperature around 25° C., but does not necessarily mean solids.

The pre-coating step can be performed by using the pre-coating apparatus 100. The pre-coating apparatus 100 includes a resin varnish 13$a$, a container 13$b$, and diverting rollers 14, 15, and 16. The pre-coating apparatus 100 applies the resin varnish 13$a$ to the aggregate 40 by submerging the aggregate 40 sent from an aggregate sending device 2, into the resin varnish 13$a$. The pre-coating apparatus 100 sends the aggregate 41 coated with the resin varnish 13*a* (that is, the pre-coated aggregate), toward a dryer 17.

The resin varnish 13*a* is a resin varnish having a filler content of 5 vol % or less in the solid content thereof, and details thereof will be described below.

The container 13*b* is not particularly limited as long as it can store the resin varnish 13*a*, and has a width wider than the width of the aggregate 40. A predetermined amount of resin varnish 13*a* is contained in the container 13*b*.

All the diverting rollers 14, 15, and 16 are rollers that change the traveling direction of the aggregate 40. The diverting rollers 14 and 16 are located on the front side and the back side, respectively, in the delivery direction of the aggregate 40 on the upper side of the container 13*b* such that the aggregate 40 turns around on the upper side of these. The lower side of the diverting roller 15 is located below the surface of the resin varnish 13*a* within the container 13*b* such that the aggregate 40 turns around under the diverting roller 15. In FIG. 1, the diverting roller 15 is submerged within the resin varnish 13*a*.

In the production method of the FRP precursor of the present embodiment, the resin varnish 13*a* is applied to the aggregate 40 in advance so that the resin is introduced into voids of the aggregate in advance. Here, the voids of the aggregate refer to spaces between filaments of yarns constituting a glass cloth if, for example, the aggregate is the glass cloth. Thus, when a thermosetting resin sheet is laminated on the aggregate in the melt-pasting step to be described below, spaces between filaments of yarns are suppressed from being gradually impregnated with only a resin in the thermosetting resin sheet, and it is possible to avoid agglomeration of a filler like filtration residue on the surfaces of the yarns. As a result, there is no local increase in the ratio of the filler in the resin layer near the surface of the glass cloth, and there is no high viscosity and poor liquidity. Thus, it is possible to suppress deterioration of moldability during lamination. Therefore, while the improvement of thermal conductivity by the filler is promoted, moldability can also be ensured. Furthermore, the pre-coating apparatus 100 tends to increase the adhesion between the resin film and the aggregate. Hereinafter, this effect may be referred to as an "effect A".

The effect A tends to become remarkable, in particular, when the bulk thickness of the aggregate is 30 µm or more. As the bulk thickness of the aggregate increases, the amount of the resin of the thermosetting resin sheet impregnated into the aggregate increases, and then the filler in the thermosetting resin sheet is likely to agglomerate on the surfaces of the yarns. Thus, when the bulk thickness of the aggregate is 30 µm or more, the effect A, which is caused by previous impregnation of the resin varnish into the aggregate, becomes remarkable. From this point of view, the bulk thickness of the aggregate is preferably 30 µm or more, more preferably 30 to 250 µm, further preferably 35 to 200 µm, particularly preferably 40 to 180 µm. Further, the bulk thickness of the aggregate may be 30 to 70 µm, or may be 100 to 250 µm or 140 to 250 µm.

Figure 3:
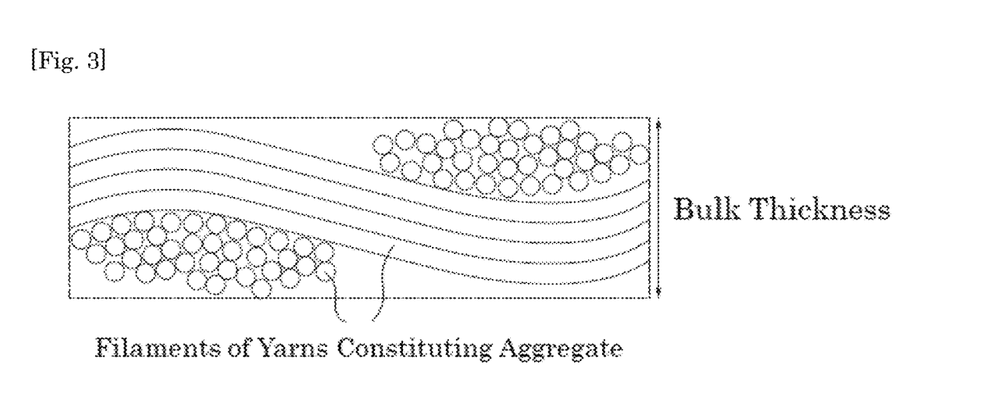
FIG. 3 is a schematic cross-sectional view of a glass cloth, which is for explaining a bulk thickness.

The "bulk thickness" indicates the thickness of the portion illustrated in FIG. 3, and specifically refers to the thickness measured in accordance with JIS R3420 (2013) 7.10.1 (meanwhile, in "7.10.1.4 operation", the B method is adopted).

Here, it is desirable that the amount of the resin varnish used in the pre-coating step satisfies the following formula (1).

$$0.05 \leq \frac{\text{Volume of solid content of applied resin varnish}}{\text{Bulk volume of aggregate} - \text{True volume of aggregate}} \leq 0.6 \quad (1)$$

Hereinafter, "volume of solid content of applied resin varnish/(bulk volume of aggregate−true volume of aggregate)" in the formula (1) may be referred to as "solid content impregnation rate". The lower limit value of the solid content impregnation rate is preferably 0.10, more preferably 0.15, and the upper limit value is preferably 0.5, more preferably 0.45. Each of these numerical values can be independently rewritten as the lower limit value or the upper limit value in the formula (1).

When the solid content impregnation rate is 0.05 or more with respect to the amount of the resin varnish in use, the effect caused by previous application of the resin varnish 13*a* to the aggregate 40 tends to be sufficiently exhibited. Further, when the solid content impregnation rate is 0.6 or less, the filler in the resin film can be sufficiently impregnated into even the gaps between the yarns of the glass cloth. Thus, it becomes easy to produce the FRP precursor highly filled with the filler, and at the same time, it is possible to avoid excessive impregnation of the resin in the resin varnish. As a result, properties of the resin film tend to be easily retained.

After the resin varnish 13*a* is applied to the aggregate 40 in advance, an organic solvent in the resin varnish is removed through heating and drying by the dryer 17 so that the hardness of the resin applied to the aggregate is adjusted. The dryer is not particularly limited, but a hot air dryer is preferable. The drying temperature is not particularly limited, but is preferably adjusted in a range of 120 to 200° C., and may be 150 to 190° C. or may be 160 to 185° C.

The pre-coated aggregate 41 whose resin hardness is adjusted by the dryer 17 advances toward the pre-coated aggregate winding device 8.

FRP Precursor Producing Apparatus 200 that Can Be Used after Pre-Coating Step; FIG. 2)

The FRP precursor producing apparatus 200 includes a pre-coated aggregate sending device 2', a pair of resin film sending devices 3, 3, a sheet heating/pressurizing device 6, and an FRP precursor winding device 9. It is preferable that the FRP precursor producing apparatus 200 further includes a sheet pressure-cooling device 7, a pair of protective film peeling mechanisms 4, 4, and a pair of protective film winding devices 5, 5.

The pre-coated aggregate sending device 2' is a device that sends out the pre-coated aggregate 41 obtained in the pre-coating step. This device rotates a roll around which the pre-coated aggregate 41 is wound, in a direction opposite to the winding direction, so as to send out the pre-coated aggregate 41 wound around the roll. In FIG. 2, the pre-coated aggregate sending device 2' sends out the pre-coated aggregate 41 from the underside of the roller toward the FRP precursor winding device 9.

Each resin film sending device 3 has a roll around which a protective film-attached resin film 50 is wound, and a support mechanism that rotatably supports the roll while applying a predetermined tension to the protective film-attached resin film 50 to be delivered.

Each resin film sending device 3 is a device that rotates the roll around which the protective film-attached resin film 50 is wound in a direction opposite to the winding direction so as to send out the protective film-attached resin film 50 wound around the roll. As described below, the protective film-attached resin film 50 is a sheet-shaped film that includes the resin film 54, a protective film 52 laminated on one aggregate-side film surface 54a of the resin film 54 (the surface on the aggregate 40 side between both surfaces of the resin film 54), and a carrier film (not illustrated) laminated on the resin film 54 on the opposite side to the protective film 52.

The paired resin film sending devices 3 and 3 are located on a front surface 41a side and a rear surface 41b side of the delivered pre-coated aggregate 41, respectively.

One resin film sending device 3 is a device that is located on the front surface 41a side of the delivered pre-coated aggregate 41, and sends out one protective film-attached resin film 50 from the underside of the roller toward one protective film peeling mechanism 4 such that the protective film 52 is located on the delivered pre-coated aggregate 41 side.

Similarly, the other resin film sending device 3 is a device that is located on the rear surface 41b side of the delivered pre-coated aggregate 41, and sends out the other protective film-attached resin film 50 from the upper side of the roller toward the other protective film peeling mechanism 4 such that the protective film 52 is located on the delivered pre-coated aggregate 41 side.

The paired protective film peeling mechanisms 4 and 4 are diverting rollers which are located on the front surface 41a side and the rear surface 41b side of the delivered pre-coated aggregate 41, respectively.

One protective film peeling mechanism 4 is a mechanism that peels off one protective film 52 from one protective film-attached resin film 50, in which the surface of the rotating diverting roller receives the protective film-attached resin film 50 sent from one resin film sending device 3 and advancing toward one protective film peeling mechanism 4, thereby allowing one resin film 54 of one protective film-attached resin film 50 to advance toward the sheet heating/pressurizing device 6, and allowing one protective film 52 to advance toward one protective film winding device 5. Accordingly, the aggregate-side film surface 54a of one resin film 54 is exposed.

Similarly, the other protective film peeling mechanism 4 is a mechanism that peels off the other protective film 52 from the other protective film-attached resin film 50, in which the surface of the rotating diverting roller receives the other protective film-attached resin film 50 sent from the other resin film sending device 3 and advancing toward the other protective film peeling mechanism 4, thereby allowing the other resin film 54 of the other protective film-attached resin film 50 to advance toward the sheet heating/pressurizing device 6 and allowing the other protective film 52 to advance toward the other protective film winding device 5. Accordingly, the aggregate-side film surface 54a of the other resin film 54 is exposed.

It is desirable that prior to a film pressure-welding step to be described below, between both surfaces of the resin film 54, the aggregate-side film surface 54a is preheated by preheating mechanisms 11a and 11b (hereinafter, referred to as a "film preheating step A"). Accordingly, melting of the thermosetting resin of each resin film 54 is promoted, and then melt-pasting tends to be easier.

From the same point of view, it is desirable that prior to a film pressure-welding step to be described below, furthermore, both surfaces of the pre-coated aggregate 41 (on the front surface 41a side and the rear surface 41b side) are preheated by preheating mechanisms 10a and 10b (hereinafter, referred to as an "aggregate preheating step B").

In the present embodiment, it is preferable that at least one of the film preheating step A and the aggregate preheating step B is included, and it is more preferable that both are included, but one or both of them may not be included.

Both the heating temperatures in the film preheating step A and the aggregate preheating step B are preferably 5 to 70° C. higher than the heating temperature in the film pressure-welding step to be described below, more preferably 7 to 60° C. higher, preferably 10 to 50° C. higher. The heating temperatures are heating temperatures in the preheating mechanisms 10a, 10b, 11a, and 11b, and mean the surface temperature of the resin film, and the surface temperature of the aggregate, respectively.

In the film preheating step A, the heating temperature is more preferably set such that the surface temperature of the resin film falls within a range of −20° C. to +30° C. of the lowest melt viscosity temperature of the resin film. More preferably, setting is made in a range of −10° C. to +25° C. of the lowest melt viscosity temperature of the resin film, particularly preferably, setting is made in a range of −5° C. to +15° C. of the lowest melt viscosity temperature of the resin film, most preferably, setting is made in a range of +2° C. to +15° C. of the lowest melt viscosity temperature of the resin film. Here, in the present specification, the lowest melt viscosity temperature is a temperature measured by a rheometer, and more specifically is a temperature measured according to a method described in Examples.

Further, in the aggregate preheating step B, the heating temperature is more preferably set such that the surface temperature of the resin impregnated into the aggregate falls within a range of −20° C. to +30° C. of the lowest melt viscosity temperature of the resin. More preferably, setting is made in a range of −5° C. to +30° C. of the lowest melt viscosity temperature of the resin, particularly preferably, setting is made in a range of +5° C. to +25° C. of the lowest melt viscosity temperature of the resin, most preferably, setting is made in a range of +8° C. to +17° C. of the lowest melt viscosity temperature of the resin. A very low heating temperature in the film preheating step A, and the aggregate preheating step B tends to reduce mixing between the resin film and the aggregate because the degree of softening of the resin in the resin film and the aggregate is small. A very high preheating temperature also tends to reduce mixing between the resin film and the aggregate because thermal curing excessively progresses, and the resin in the resin film and the aggregate is cured.

A heating method in the film preheating step A and the aggregate preheating step B is not particularly limited, and various methods such as radiation, contact and convection can be used. Among these, radiation is preferable. As for a radiation-type heating element, infrared rays or visible light including infrared rays can be used. By using such a heating element, it is possible to suppress the deformation of the resin surface and the sticking of the film surface, which are caused by "flattering" of the film. In the film preheating step A and the aggregate preheating step B, the heating position is preferably a position within a line speed×20 sec in front of a heating/pressurizing roll from the viewpoint of suppressing cooling, more preferably a position within a line speed×5 sec.

The paired protective film winding devices 5 and 5 are winding devices which are located on the front surface 41a side and the rear surface 41b side of the delivered pre-coated aggregate 41, respectively, and wind the protective films 52 and 52 peeled off by the pair of protective film peeling mechanisms 4 and 4.

Melt-Pasting Step; FIG. 2)

As described above, the melt-pasting step is a step of melt-pasting a pair of resin films, each having a filler content of 30 vol % or more, to both surfaces of the aggregate after the pre-coating step.

The melt-pasting step can be carried out by using the sheet heating/pressurizing device 6. The sheet heating/pressurizing device 6 includes a pair of heating/compression rollers, and a compression force application mechanism (not illustrated) that applies a compression force to the pair of heating/compression rollers. The pair of heating/compression rollers has a heating element inside such that heating can be performed at a predetermined set temperature.

The sheet heating/pressurizing device 6 forms a sheet-shaped FRP precursor 60 by pressure-welding the resin films 54, 54 to the pre-coated aggregate 41 that has entered, with the pair of rotating heating/compression rollers (the film pressure-welding step) and sends the FRP precursor 60 toward the sheet pressure-cooling device 7.

Specifically, the film pressure-welding step is a film pressure-welding step of obtaining the FRP precursor, in which under normal pressure, in one resin film between the paired resin films, between both surfaces, a surface on the aggregate side, i.e., one aggregate-side film surface, is pressure-welded to one of both surfaces of the aggregate, whereas in the other resin film between the paired resin films, between both surfaces, a surface on the aggregate side, i.e., the other aggregate-side film surface, is pressure-welded to the other of both surfaces of the aggregate.

Specifically, in a state where the resin films 54 and 54 sent from the paired protective film peeling mechanisms 4 and 4 are laminated on the front surface 41a and the rear surface 41b of the pre-coated aggregate 41 sent from the pre-coated aggregate sending device 2', respectively, the pre-coated aggregate 41, and the resin films 54 and 54 sent from the paired protective film peeling mechanisms 4 and 4, respectively, enter between the pair of heating/compression rollers.

When the resin films 54 are bonded to the pre-coated aggregate 41 through heating and pressurization, the temperature of the heating/compression rollers preferably falls within a range of −40° C. to +20° C. of the lowest melt viscosity temperature of the resin film 54, more preferably within a range of −30° C. to +10° C. of the lowest melt viscosity temperature of the resin film 54, further preferably within a range of −20° C. to +5° C. of the lowest melt viscosity temperature of the resin film 54, most preferably within a range of −20° C. to −5° C. of the lowest melt viscosity temperature of the resin film 54. The pressure may be any nip pressure, but is preferably a nip pressure at which the exudation of 6.4 mm-punched holes is 50 to 1,200 μm when heating and pressurization are carried out through roll lamination in accordance with a test method No. 2.3.17.1B of IPC-TM-650, more preferably a nip pressure at which it is 100 to 1,000 μm.

Here, one resin film 54 is laminated on the pre-coated aggregate 41 in a state where the aggregate-side film surface 54a side of one resin film 54 is in contact with the front surface 41a side of the pre-coated aggregate 41. Further, the other resin film 54 is laminated on the pre-coated aggregate 41 in a state where the aggregate-side film surface 54a side of the other resin film 54 is in contact with the rear surface 41b side of the pre-coated aggregate 41. Thus, the FRP precursor 60 is formed. The FRP precursor 60 sent from the sheet heating/pressurizing device 6 is in a high temperature state.

The sheet pressure-cooling device 7 includes a pair of cooling/compression rollers, and a compression force application mechanism (not illustrated) that applies a compression force to the pair of cooling/compression rollers. The pair of cooling/compression rollers compresses and cools the high-temperature FRP precursor 60 sent from the sheet heating/pressurizing device 6, with the pair of rotating cooling/compression rollers, and sends it to the FRP precursor winding device 9.

The FRP precursor winding device 9 has a roll around which the sheet-shaped FRP precursor 60 sent from the sheet pressure-cooling device 7 is wound, and a drive mechanism (not illustrated) that rotates the roll.

Next, the aggregate, the resin varnish and the resin film used in the production method of the FRP precursor will be described in detail.

Aggregate

Examples of the aggregate include a woven fabric and a non-woven fabric, which are formed by using each of inorganic fiber base materials such as glass and carbon; organic fiber base materials such as aramid and cellulose; metal fiber base materials made of iron, copper, aluminum, and alloys of these metals or using a combination of two or more types of these. The aggregate may be appropriately selected according to purposes such as insulation property and conductivity. As for the aggregate, a glass cloth (a woven glass fabric) can be selected.

In the aggregate, the effect A tends to be remarkable when the aggregate has voids of 15 $cm^3$ or more per 1 $m^2$. This is because if there are many voids, the resin in the resin film easily penetrates into the voids while the filler hardly penetrates into the voids, whereas if there are few voids, the amount of resin in the resin film penetrating into the voids is small and thus the extent to which the filler agglomerates on the surface of the aggregate (surfaces of yarns for the glass cloth) like filtration residue is small.

From the viewpoint, the aggregate may have voids of 15 to 100 $cm^3$, 20 to 85 $cm^3$, or 23 to 75 $cm^3$ per 1 $m^2$. The voids may be obtained by subtracting a true volume from a bulk volume.

Further, in a case where the aggregate is, for example, a woven fabric such as a glass cloth, if the number of filaments constituting the yarn is 50 or more, the woven fabric tends to function more easily as a filter cloth for the resin film. Thus, in the case of such an aggregate, the effect A is likely to be remarkably exhibited. The number of filaments constituting the yarn may be 50 to 500, may be 50 to 450, may be 100 to 450, or may be 100 to 300. Otherwise, the number of filaments constituting the yarn may be 300 to 500.

Resin Varnish

As described above, the resin varnish used in the pre-coating step is a resin varnish having a filler content of 5 vol % or less in the solid content thereof, and has volatile components such as an organic solvent, besides the solid content. The content of the filler in the resin varnish is preferably 3 vol % or less, more preferably 2.5 vol % or less, further preferably 2.0 vol % or less in the solid content. Such a small amount of filler in the resin varnish is used to prevent the liquidity of the resin varnish from being excessively increased. For example, when a resin with a higher viscosity is used, the filler may not be contained. That is, in the resin varnish used in the pre-coating step, the lower limit value of the content of the filler may be 0 vol % in the solid content, may be 0.2 vol % in the solid content, may be 0.5 vol % in the solid content, may be 1.0 vol % in the solid content, or may be 1.3 vol % in the solid content.

The average particle size of the filler contained in the resin varnish is preferably 0.1 to 10 µm, more preferably 0.3 to 7 µm, further preferably 0.5 to 5 µm. When the average particle size of the filler contained in the resin varnish falls within the above range, the liquidity of the resin varnish is likely to be moderate.

The filler that may be contained in the resin varnish is not particularly limited, but examples thereof include oxides such as silica, aluminum oxide, zirconia, mullite, and magnesia; hydroxides such as aluminum hydroxide, magnesium hydroxide, and hydrotalcite; nitride ceramics such as aluminum nitride, silicon nitride, and boron nitride; sparingly soluble salts such as titanates such as barium titanate and calcium titanate; natural or synthetic clay minerals such as talc, montmorillonite, saponite, and hydrotalcite; metal particles, and carbon particles. The filler that may be contained in the resin varnish is preferably an inorganic filler from the viewpoint of adjusting insulation property and liquidity, more preferably an oxide or a hydroxide, and is further preferably silica or aluminum hydroxide from the viewpoint of cost, insulation property, low thermal expansion, flame retardancy, mechanical abrasion, and the like.

The solid content concentration of the resin varnish is preferably 5 to 55% by mass from the viewpoint of impregnation of a resin up to voids of the aggregate (for example, between filaments of yarns for a glass cloth), and may be 5 to 50% by mass, may be 5 to 45% by mass, may be 15 to 45% by mass, may be 25 to 45% by mass, or may be 35 to 45% by mass.

The organic solvent contained in the resin varnish is not particularly limited, and examples thereof include: ketone-based solvents such as acetone, methylethylketone, methyl isobutyl ketone, cyclohexanone, and 4-methyl-2-pentanone; aromatic solvents such as toluene, xylene, and mesitylene; ester-based solvents such as acetic acid ethyl ester, and γ-butyrolactone; ether-based solvents such as tetrahydrofuran; alcohol-based solvents such as ethylene glycol monoethyl ether, dipropylene glycol monomethyl ether, dipropylene glycol monoethyl ether, and tripropylene glycol monomethyl ether; nitrogen atom-containing solvents such as N,N-dimethylformamide, N,N-dimethylacetamide, and N-methylpyrrolidone; and sulfur atom-containing solvents such as dimethyl sulfoxide. These organic solvents may be used singly, or two or more types may be used in combination.

Other components contained in the resin varnish are described in the same manner as in the description on components contained in the resin film to be described below.

Resin Film

The resin film is not particularly limited, but is preferably a thermosetting resin film. In the present specification, the description on the resin film can be read as the description on the thermosetting resin film.

The resin film used in melt-pasting to the aggregate is obtained by forming a resin composition having a filler content of 30 vol % or more (preferably, a thermosetting resin composition), into a film shape, and drying it. In particular, in the case of a thermosetting resin composition, it is formed into a film shape and then is B-staged through drying. Here, B-staging refers to making the stage of B-stage defined in JIS K6900 (1994), and is also called semi-curing.

The drying conditions are not particularly limited, but it is possible to adopt a condition of heating and drying for 1 to 5 min at 80 to 180° C.

The thermosetting resin film contains a thermosetting resin, a filler and if necessary, other components. Hereinafter, each component that may be contained in the thermosetting resin film will be described in detail.

The thermosetting resin is not particularly limited, and examples thereof include a phenolic resin, a urea resin, a furan resin, an epoxy resin, and a polyimide resin. In particular, from the viewpoint of workability, handleability and cost, an epoxy resin is preferable.

As for the epoxy resin, a bifunctional or higher functional epoxy resin is preferable. The bifunctional or higher functional epoxy resin is not particularly limited, and examples thereof include: bisphenol-type epoxy resins such as a bisphenol A-type epoxy resin, a bisphenol F-type epoxy resin, and a bisphenol AD-type epoxy resin; alicyclic epoxy resins; novolac-type epoxy resins such as a phenol novolac-type epoxy resin, a cresol novolac-type epoxy resin, a bisphenol A novolac-type epoxy resin, and an aralkyl novolac-type epoxy resin; diglycidyl etherified products of polyfunctional phenol; and hydrogenates of these. These epoxy resins may be used singly, or two or more types may be used in combination. Although not particularly limited, the epoxy resin preferably contains at least one type selected from the group including a bisphenol-type epoxy resin and a novolac-type epoxy resin, and more preferably contains a novolac-type epoxy resin.

When the FRP precursor is required to be flame retardant, a halogenated epoxy resin may be blended. Further, in order to satisfy flame retardancy without adding the halogenated epoxy resin, a compound generally referred to as a flame retardant or a flame retardant aid, such as tetrabromo bisphenol A, decabromodiphenyl ether, antimony oxide, tetraphenylphosphine, organic phosphorus compound, and zinc oxide, may be added.

When the epoxy resin is used as the thermosetting resin, an epoxy resin curing agent may be used.

The epoxy resin curing agent is not particularly limited, and examples thereof include phenolic resins, amine compounds, acid anhydrides, boron trifluoride monoethylamine, isocyanate, dicyandiamide, and urea resins.

The phenolic resin is not particularly limited, and examples thereof include: resol-type phenolic resins; novolac-type phenolic resins such as a phenol novolac resin, and a cresol novolac resin; a naphthalene-type phenolic resin, a high ortho-type novolac phenolic resin, a terpene-modified phenolic resin, a terpene phenol-modified phenolic resin, an aralkyl-type phenolic resin, a dicyclopentadiene-type phenolic resin, a salicylaldehyde-type phenolic resin, and a benzaldehyde-type phenolic resin. Among these, a phenol novolac resin, a cresol novolac resin, and a partially modified aminotriazine novolac resin are preferred.

The amine compound is not particularly limited, and examples thereof include: aliphatic amines such as triethylenetetramine, tetraethylenepentamine, and diethylaminopropylamine; and aromatic amines such as metaphenylenediamine, and 4,4'-diaminodiphenylmethane.

The acid anhydride is not particularly limited, and examples thereof include phthalic anhydride, methyltetrahydro phthalic anhydride, tetrahydro phthalic anhydride, and hexahydro phthalic anhydride. These epoxy resin curing agents may be used singly, or two or more types may be used in combination.

The content of the epoxy resin curing agent is preferably an amount by which the ratio of the equivalent of reactive groups of the curing agent is 0.3 to 1.5 equivalents with respect to 1 as an epoxy equivalent of the epoxy resin. When the content of the epoxy resin curing agent falls within the above range, the curing degree is easy to control, and the productivity tends to be good.

The thermosetting resin film may further contain a curing accelerator.

The curing accelerator is not particularly limited, and examples thereof include imidazole compounds, organic phosphorus compounds, tertiary amine, and quaternary ammonium salts. The imidazole compound may be an imidazole compound which has latency through masking of a secondary amino group of imidazole with acrylonitrile, isocyanate, melamine, acrylate, or the like. Examples of the imidazole compound used herein include imidazole, 2-methylimidazole, 4-ethyl-2-methylimidazole, 2-phenylimidazole, 2-undecylimidazole, 1-benzyl-2-methylimidazole, 2-heptadecylimidazole, 4,5-diphenylimidazole, 2-methylimidazoline, 2-ethyl-4-methylimidazoline, 2-undecylimidazoline, and 2-phenyl-4-methylimidazoline. Although not particularly limited, the curing accelerator preferably contains the imidazole compound.

Further, the thermosetting resin film may contain a photoinitiator. The photoinitiator has a function of starting curing by generating radicals, anions or cations through photolysis.

These curing accelerators may be used singly, or two or more types may be used in combination.

The content of the curing accelerator is preferably 0.01 to 20 parts by mass with respect to 100 parts by mass of the thermosetting resin. When the content of the curing accelerator is 0.01 parts by mass or more with respect to 100 parts by mass of the thermosetting resin, a sufficient curing acceleration effect tends to be obtained, and when it is 20 parts by mass or less, the storage stability of the thermosetting resin film and the physical properties of the cured product tend to be excellent, and the economic efficiency also tends to be excellent.

The thermosetting resin film contains a predetermined amount of filler from the viewpoint of light opacity, abrasion resistance, low thermal expansion, dielectric properties, and thermal conductivity, the viewpoint of magnetic permeability reduction, and the viewpoint of increasing the content of ingredients.

The filler is not particularly limited, and examples thereof include: oxides such as silica, aluminum oxide, zirconia, mullite, and magnesia; hydroxides such as aluminum hydroxide, magnesium hydroxide, and hydrotalcite; nitride ceramics such as aluminum nitride, silicon nitride, and boron nitride; sparingly soluble salts such as barium titanate, and calcium titanate; natural or synthetic clay minerals such as talc, montmorillonite, saponite, and hydrotalcite; metal particles, and carbon particles; and magnetic materials such as ferrite. As the filler contained in the thermosetting resin film, an inorganic filler is preferable from the viewpoint of insulation property, and silica is more preferable from the viewpoint of cost and low thermal expansion.

The fillers may be used singly, or two or more types may be used in combination.

Since the filler has a wide range of specific gravities from small to large as compared to the resin, it is desirable to consider the amount of filler to be added in terms of volume ratio rather than parts by mass.

The content of the filler is 30 vol % or more in the thermosetting resin film, preferably 30 to 65 vol %, more preferably 30 to 55 vol %, further preferably 35 to 45 vol % from the viewpoint of high filling of a filler with a high thermal conductivity. When the content of the filler is 30 vol % or more in the thermosetting resin film, it can be said that a high filling state of the filler is made, so that the thermal conductivity and low thermal expansion of the FRP precursor can be sufficiently increased. Further, when the content of the filler is 65 vol % or less in the thermosetting resin film, a significant increase in resin viscosity can be suppressed, and thus, the workability and adhesiveness tend not to be deteriorated during melt-pasting to the aggregate.

Besides the above components, as necessary, it is also possible to contain other components in a range where the effect of the present embodiment is not inhibited.

For example, in order to promote improvement of the dispersibility of the filler, and improvement of the adhesion to the aggregate or the target object, a coupling agent may be contained. The coupling agent is not particularly limited, and examples thereof include: silane coupling agents having a vinyl group, such as vinyltrichlorosilane, and vinyltriethoxysilane; silane coupling agents having an epoxy group, such as 3-glycidoxypropyl trimethoxysilane, and 2-(3,4-epoxycyclohexyl)ethyltrimethoxysilane; silane coupling agents having an amino group, such as 3-aminopropyl trimethoxysilane, and N-2-(aminoethyl)-3-aminopropyl triethoxysilane; and titanate-based coupling agents. These coupling agents may be used singly, or two or more types may be used in combination.

The content of the coupling agent is preferably 0.01 to 5% by mass in the thermosetting resin film. When the content of the coupling agent is 0.01% by mass or more in the thermosetting resin film, there is a tendency to be able to sufficiently cover the aggregate surface and the filler surface, and when it is 5% by mass or less, there is a tendency to be able to suppress generation of excess coupling agent.

The thermosetting resin film can be obtained by applying the thermosetting resin composition containing the above components to the carrier film, removing an unnecessary organic solvent, and performing heating and drying.

The carrier film is not particularly limited, and examples thereof include: organic films such as polyethylene terephthalate (PET), biaxially oriented polypropylene (OPP), polyethylene, polyvinyl fluoride, and polyimide; films of copper, aluminum, and alloys of these metals; and films obtained by performing a releasing treatment on the surface of these organic films or metal films by a releasing agent.

As the FRP precursor obtained by the production method of the present embodiment, a prepreg or the like may be preferably exemplified. When the thermosetting resin film is used as the resin film, the obtained FRP precursor is subjected to sufficient thermal curing, that is, C-staging so as to produce FRP. Here, C-staging refers to making the stage of C-stage defined in JIS K6900 (1994).

The FRP obtained in this way is highly filled with a filler, and thus the thermal conductivity is high, the heat resistance is also excellent, and moreover, the scratch (an indicator of moldability of the FRP precursor) is effectively suppressed. Further, when the filler is an inorganic filler, low thermal expansion is also excellent.

Further, a metal-clad laminate plate can be produced by preparing one sheet of FRP precursor obtained in the present embodiment or by stacking 2 to 20 sheets, and then performing lamination-molding with a structure having metal foil arranged on one surface or both surfaces thereof. As for the metal foil, for example, those used for the laminate plates for electrical insulating materials can be used. The structure of the metal-clad laminate plate is a structure having metal foil on one surface or both surfaces of the structure of the above-described stacked body.

The metal for the metal foil is preferably copper, gold, silver, nickel, platinum, molybdenum, ruthenium, aluminum, tungsten, iron, titanium, chromium, or an alloy containing at least one type of these metal elements, and is more preferably copper.

Lamination-molding conditions are using, for example, a multistage press, a multistage vacuum press, continuous molding, an autoclave molding machine, or the like, and the molding can be performed under conditions of a temperature of 100 to 250° C., a pressure of 0.2 to 10 MPa, and a heating time of 0.1 to 5 h.

EXAMPLE

Next, the present embodiment will be described in more detail by the following examples, but these examples do not limit the present disclosure.

Example 1

Preparation of Resin Varnish 1 for Pre-Coating Step

To 100 parts by mass of a phenol novolac-type epoxy resin (N-660; manufactured by DIC Corporation), and 60 parts by mass of a cresol novolac resin (KA-1165; manufactured by DIC Corporation), 30 parts by mass of cyclohexane, and 200 parts by mass of methylethylketone were added, and then were dissolved through sufficient stirring. To this, 5 parts by mass of amorphous silica (AEROSIL 200; manufactured by AEROSIL Co., Ltd.) as a filler, 1 parts by mass of a coupling agent (A-187; manufactured by Momentive Performance Materials, Inc.), and 1.4 parts by mass of isocyanate-masked imidazole (G8009L; manufactured by DKS Co., Ltd.) as a curing accelerator were added, and were dissolved and dispersed through stirring so as to prepare a resin varnish 1 having a solid content concentration of 42% by mass.

Production of Thermosetting Resin Film A

To 100 parts by mass of a phenol novolac-type epoxy resin (N-660; manufactured by DIC Corporation), and 60 parts by mass of a cresol novolac resin (KA-1165; manufactured by DIC Corporation), 15 parts by mass of cyclohexane, and 130 parts by mass of methylethylketone were added, and then were dissolved through sufficient stirring. To this, 180 parts by mass of aluminum hydroxide (CL-303; manufactured by Sumitomo Chemical Co., Ltd.) as a filler, 1 parts by mass of a coupling agent (A-187; manufactured by Momentive Performance Materials, Inc.), and 2.5 parts by mass of isocyanate-masked imidazole (G8009L; manufactured by DKS Co., Ltd.) as a curing accelerator were added, and were dissolved and dispersed through stirring so as to obtain a thermosetting resin varnish A having a solid content concentration of 70% by mass.

This thermosetting resin varnish A was applied to a PET film with a width of 580 mm (G-2; manufactured by Teijin Dupont Films Co., Ltd.), such that the coating width was 525 mm, and the thickness after drying was 50 μm. Then, through drying at 130° C., a thermosetting resin film A was produced.

The lowest melt viscosity temperature of the produced thermosetting resin film A was measured by using a rheometer (AR-200ex; φ20 mm jig, manufactured by TA Instruments Japan Inc.) under the condition of a temperature rise rate of 3° C./min, and as a result, it was 124° C.

Pre-Coating Step

Next, the resin varnish 1 was diluted with a mixed solvent of methylethylketone and cyclohexanone (methylethylketone:cyclohexanone=10:1 (mass ratio)), and was applied to a glass cloth as an aggregate (basis weight 209 g/m², IPC #7628, base material width 530 mm: manufactured by NAN YA Plastic Co., Ltd.). Then, through drying with a hot air dryer at 175° C., the solvent was removed to obtain an undercoated glass cloth α with a solid content of 8% by mass. The mass of the solid content contained in the undercoated glass cloth α can be obtained from a difference between the mass of the undercoated glass cloth α and the mass of the glass cloth as the aggregate.

Further, the lowest melt viscosity temperature of the resin impregnated into the produced undercoated glass cloth α was measured by using a rheometer (AR-200ex; φ20 mm jig manufactured by TA Instruments Japan Inc.) under the condition of a temperature rise rate of 3° C./min, and as a result, it was 133° C.

Film Pressure-Welding Step

The undercoated glass cloth α was interposed between the thermosetting resin films A, and the thermosetting resin films A were pressurized and impregnated into the aggregate by using a pressure-heating roll at a roll temperature of 110° C., a nip pressure of 0.2 MPa, and a speed of 1.0 m/min. Meanwhile, the pressure-impregnation was performed after the surface of the thermosetting resin film A on the side in contact with the aggregate was preheated by a halogen heater, at 30 mm in front of the pressure-heating roll (on the basis of the center of the heating surface) so that the surface temperature became 130° C., and also the aggregate was preheated so that the surface temperature became 145° C.

Next, through cooling with a cooling roll, and winding, an FRP precursor A, which is a so-called prepreg, was produced.

Example 2

An FRP precursor B, which is a so-called prepreg, was produced by performing the same operation as in Example 1 except that the following points were changed.

Change Points

Instead of the thermosetting resin film A that was produced such that the thickness after drying was 50 μm, a thermosetting resin film was produced such that the thickness after drying was 40 μm (this is referred to as a "thermosetting resin film B". The lowest melt viscosity: 131° C.), and this was used instead of the thermosetting resin film A.

The glass cloth (basis weight 209 g/m², IPC #7628, base material width 530 mm: manufactured by NAN YA Plastic Co., Ltd.) was changed to a glass cloth (basis weight 48 g/m², IPC #1080, base material width 530 mm: manufactured by Nitto Boseki Co., Ltd.).

Instead of the obtained undercoated glass cloth α with a solid content of 8% by mass, a glass cloth was produced by adjusting the solid content to 25% by mass (this is called an "undercoated glass cloth β". The lowest melt viscosity of the resin in the undercoated glass cloth β: 138° C.), and this was used instead of the undercoated glass cloth α.

In the preheating, the surface temperature of the thermosetting resin film B was adjusted to 120° C., and the surface temperature of the aggregate was adjusted to 130° C.

Example 3

An FRP precursor C, which is a so-called prepreg, was produced by performing the same operation as in Example 1 except that the following points were changed.

Change Points

Instead of the thermosetting resin film A that was produced such that the thickness after drying was 50 μm, a thermosetting resin film was produced such that the thickness after drying was 20 μm (this is referred to as a "thermosetting resin film C". The lowest melt viscosity 127° C.), and this was used instead of the thermosetting resin film A.

Instead of the obtained undercoated glass cloth α with a solid content of 8% by mass, an undercoated glass cloth was produced by adjusting the solid content to 33% by mass (called an undercoated glass cloth γ. The lowest melt viscosity of the resin in the undercoated glass cloth γ: 126° C.), and this was used instead of the undercoated glass cloth α.

Comparative Example 1

An FRP precursor W was produced by performing the same operation as in Example 1 except that the pre-coating step was not carried out [that is, instead of the undercoated glass cloth α, the glass cloth (basis weight 209 g/m², IPC #7628, base material width 530 mm: manufactured by NAN YA Plastic Co., Ltd.) was used as it was].

Comparative Example 2

An FRP precursor X was produced by performing the same operation as in Example 2 except that the pre-coating step was not carried out [that is, instead of the undercoated glass cloth β, the glass cloth (basis weight 48 g/m², IPC #1080, base material width 530 mm: manufactured by Nitto Boseki Co., Ltd.) was used as it was].

Reference Example 1

An FRP precursor Y was produced by performing the same operation as in Example 2 except that instead of the thermosetting resin film B that was produced such that the thickness after drying was 40 μm, a thermosetting resin film whose thickness after drying was 45 μm (this is referred to as a "thermosetting resin film 1". The lowest melt viscosity 130° C.) was used, instead of the glass cloth (basis weight 48 g/m², IPC #1080, base material width 530 mm: manufactured by Nitto Boseki Co., Ltd.) a glass cloth (basis weight 24 g/m², IPC #1037, base material width 530 mm: manufactured by Nitto Boseki Co., Ltd.) was used, and the pre-coating step was not carried out.

The resin varnish 1 and the entire thermosetting resin film are summarized in Table 1 below, the glass cloths used in examples respectively are summarized in Table 2, and respective production conditions of the FRP precursor in examples are summarized in Table 3 below.

Further, the resin was collected from the surface of the FRP precursor produced in each example, and the lowest melt viscosities were measured by using a rheometer (AR-200ex; φ20 mm jig, manufactured by TA Instruments Japan Inc.) under the condition of a temperature rise rate of 3° C./min and are summarized in Table 4.

TABLE 1

|  | Solid content specific gravity | Filler volume ratio (%) |
|---|---|---|
| Resin varnish 1 (for pre-coating step) | 1.32 | 1.8 |
| Entire thermosetting resin film | 1.72 | 37.3 |

TABLE 2

| | Type of glass cloth | | | | | |
|---|---|---|---|---|---|---|
| | Glass cloth used | Number of filaments constituting one yarn (number) | Weight (g/m²) | Bulk thickness (μm) | Bulk volume per 1 m² (cm³) | True volume per 1 m² (cm³) | Voids per 1 m² (cm³) |
| Example 1 | #7628 | 400 | 209 | 167 | 167.0 | 96.8 | 70.2 |
| Example 2 | #1080 | 200 | 47 | 47 | 47.0 | 21.8 | 25.2 |
| Example 3 | #7628 | 400 | 209 | 167 | 167.0 | 96.8 | 70.2 |
| Comparative Example 1 | #7628 | 400 | 209 | 167 | 167.0 | 96.8 | 70.2 |
| Comparative Example 2 | #1080 | 200 | 47 | 47 | 47.0 | 21.8 | 25.2 |
| Reference Example 1 | #1037 | 100 | 24 | 24 | 24.0 | 11.1 | 12.9 |

TABLE 3

| | Solid content of undercoated glass cloth (mass %) | A: Volume of solid content of applied resin varnish (cm³) | B: Bulk volume of aggregate (cm³) | C: True volume of aggregate (cm³) | A/(B − C) [Solid content impregnation rate] |
|---|---|---|---|---|---|
| | | In formula (1) | | | |
| Example 1 | 8.0 | 13.83 | 167.0 | 96.8 | 0.16 |
| Example 2 | 25.0 | 11.93 | 47.0 | 21.8 | 0.41 |
| Example 3 | 33.0 | 78.28 | 167.0 | 96.8 | 0.90 |
| Comparative Example 1 | 0 | 0 | 167.0 | 96.8 | 0 |
| Comparative Example 2 | 0 | 0 | 47.0 | 21.8 | 0 |
| Reference Example 1 | 0 | 0 | 24.0 | 11.1 | 0 |

TABLE 4

| | FRP precursor | Lowest melt viscosity (Pa · s) of surface resin of FRP precursor |
|---|---|---|
| Example 1 | A | $3.8 \times 10^2$ |
| Example 2 | B | $1.8 \times 10^3$ |
| Example 3 | C | $2.1 \times 10^2$ |
| Comparative Example 1 | W | $2.5 \times 10^5$ |
| Comparative Example 2 | X | $3.3 \times 10^4$ |
| Reference Example 1 | 1 | $4.1 \times 10^3$ |

Evaluation Method

The following measurement and evaluation were performed on the FRP precursor obtained in each example.

The measurement and evaluation methods for Examples 1 and 3, and Comparative Example 1, and the measurement and evaluation methods for Example 2, Comparative Example 2 and Reference Example 1 are different from each other, and thus they will be described in order.

1. Measurement and Evaluation Methods for Examples 1 and 3 and Comparative Example 1

First, each FRP precursor produced in each of Examples 1 and 3 and Comparative Example 1 was cut into a length of 530 mm, and copper foil (GTS-MP-18, manufactured by FURUKAWA ELECTRIC CO., LTD.) was laminated on both sides of four overlapping sheets. This was interposed between SUS mirror plates, and was subjected to heat-molding by being maintained at a product pressure of 3.0 MPa, and a product temperature of 185° C. for 70 min so that a copper clad laminate plate for evaluation with a thickness of 0.8 mm was produced. Then, the measurement and evaluation for each were performed according to the following methods.

(1-1) Evaluation of Soldering Heat Resistance

The copper clad laminate plate for evaluation was used to perform a test of soldering heat resistance in accordance with JIS C6481 (1996) 5.5. After the soldering treatment, the appearance of the sample was visually observed, and was evaluated according to the following criteria. The results are noted in Table 5.
A: Swelling occurs.
C: No swelling occurs.

(1-2) Evaluation of Moldability

Copper foil on both surfaces of the copper clad laminate plate for evaluation was etched with an acidic iron chloride solution of hydrochloric acid, and the surface appearance of the etched stacked body was visually observed and was evaluated according to the following criteria. The results are noted in Table 5.
A: No scratch is observed.
C: Scratch is observed.

(1-3) Measurement of Thermal Conductivity

On the etched stacked body produced in "(1-2) evaluation of moldability", the thermal conductivity was measured according to the JIS R1611 (2010) 6.2 flash method. The results are noted in Table 5.

2. Measurement and Evaluation Methods for Example 2, Comparative Example 2 and Reference Example 1

Next, each FRP precursor produced in each of Example 2, Comparative Example 2 and Reference Example 1 was cut into a length of 530 mm.

Then, an inner layer pattern of FIG. 6.4-19 described in JPCA-UB-017.5.5 was formed on a 510 mm-square copper clad laminate plate (MCL-E-679FG, thickness 0.2 mm, 35 μm-thickness copper foil on both surfaces, manufactured by Showa Denko Materials Co., Ltd.), and then the copper surface was roughened (CZ-8101, etching amount (weight method) 1.5 μm, manufactured by MEC Co., Ltd.) to produce an inner layer substrate.

One sheet of the FRP precursor cut into a length of 530 mm was disposed on each of both surfaces of the inner layer substrate, and on the outside thereof, copper foil (GTS-MP-12: manufactured by FURUKAWA ELECTRIC CO., LTD.) was disposed. Then, this was interposed between SUS mirror plates, and was maintained at a product pressure of 2.5 MPa, and a maximum temperature of 185° C. for 90 min so as to produce a 4-layer copper clad laminate plate with a thickness of 0.4 mm. A pattern of FIG. 6.4-19 described in JPCA-UB-017.5.5 was also formed on the outer layer to obtain a multi-layer printed wiring board (4-layer board).

(2-1) Evaluation of Soldering Heat Resistance

The multi-layer printed wiring board (4-layer board) was tested according to JPCA-UB-017.5.5.1, at a soldering bath temperature of 288° C., and then after the test completion, the appearance of the sample was visually observed and was evaluated according to the following criteria. The results are noted in Table 5.

A: Swelling occurs.

C: No swelling occurs.

(2-2) Evaluation of Moldability

Copper foil on the outermost layer of the multi-layer printed wiring board (4-layer board) was removed with an acidic iron chloride solution of hydrochloric acid, and the embeddability (moldability) of the inner layer pattern in the FRP precursor was visually observed, and was evaluated according to the following criteria. The results are noted in Table 5.

A: No scratch is observed.

C: Scratch is observed.

TABLE 5

| | Measurement and evaluation result | | | |
|---|---|---|---|---|
| | FRP precursor | Soldering heat resistance | Moldability | Thermal conductivity (W/m · K) |
| Example 1 | A | A | A | 0.89 |
| Example 2 | B | A | A | — |
| Example 3 | C | A | A | 0.64 |
| Comparative Example 1 | W | C | C | 0.76 |
| Comparative Example 2 | X | C | C | — |
| Reference Example 1 | 1 | A | A | — |

In Table 5, Examples 1 and 3 can be compared with Comparative Example 1, and Example 2, Comparative Example 2, and Reference Example 1 can be compared.

The FRP precursor obtained in the production method of Examples 1 to 3 is excellent in soldering heat resistance and moldability. This is because there is no local increase in the ratio of the filler in the resin layer near the surface of the glass cloth, and there are no high viscosity and poor liquidity. It is assumed that this is the result obtained because it was possible to suppress deterioration of moldability during lamination.

Meanwhile, the FRP precursor obtained by the production method of Comparative Example 1 has insufficient soldering heat resistance and moldability as compared to the FRP precursor obtained by the production method of Examples 1 and 3 (see Table 5). Further, the FRP precursor obtained by the production method of Comparative Example 2 has insufficient soldering heat resistance and moldability as compared to the FRP precursor obtained by the production method of Example 2 (see Table 5).

Meanwhile, although the FRP precursor obtained in the production method of Reference Example 1 is excellent in soldering heat resistance and moldability, as noted in Table 2, this result indicates that when the bulk thickness of the aggregate is small, there is a tendency that originally, the reduction of soldering heat resistance and moldability is not observed, whereas when the bulk thickness of the aggregate is large, the effect of the present embodiment is easy to observe.

REFERENCE SIGNS LIST

100: pre-coating apparatus
200: FRP precursor producing apparatus used after the pre-coating step
2: aggregate sending device
2': pre-coated aggregate sending device
3: resin film sending device
4: protective film peeling mechanism
5: protective film winding device
6: sheet heating/pressurizing device (film pressure-welding unit)
7: sheet pressure-cooling device
8: pre-coated aggregate winding device
9: FRP precursor winding device
10$a$: preheating mechanism
10$b$: preheating mechanism
11$a$: preheating mechanism
11$b$: preheating mechanism
17: dryer
40: aggregate
40$a$: one surface of aggregate (between both surfaces of aggregate, one side)
40$b$: the other surface of aggregate (between both surfaces of aggregate, the other side)
41: pre-coated aggregate
41$a$: one surface of pre-coated aggregate (between both surfaces of aggregate, one side)
41$b$: the other surface of pre-coated aggregate (between both surfaces of aggregate, the other side)
50: protective film-attached resin film
52: protective film
54: resin film
54$a$: aggregate-side film surface
60: FRP precursor

The invention claimed is:

1. A method of producing an FRP precursor, the method comprising:
   pre-coating a resin varnish having a filler content of 5 vol % or less in a solid content thereof, to a sheet-shaped aggregate;
   providing a pair of resin films, each having a filler content of 30 vol % or more; and
   melt-pasting the pair of resin films, each having a filler content of 30 vol % or more, to respective sides of the aggregate, after the pre-coating,
   wherein in the pre-coating, an volume of solids in the resin varnish to be used is determined by the following formula (1):

$$0.05 \leq \frac{\text{Volume of solid content of applied resin varnish} (cm^3/cm^2)}{\text{Bulk volume of aggregate} (cm^3/cm^2) - \text{True volume of aggregate} (cm^3/cm^2)} \leq 0.6. \quad (1)$$

2. The method according to claim 1, wherein the melt-pasting includes a film pressure-welding, and
   the film pressure-welding comprises:
   a first pressure welding one resin film of the pair of resin films to side of the aggregate; and
   a second pressure-welding one surface of the other of the pair of resin films to the other side of the aggregate.

3. The method according to claim 2, further comprising preheating the one surface to be subjected to the first pressure-welding of the one resin film and one surface to be subjected to the second pressure-welding of the other resin film, prior to the film pressure-welding.

4. The method according to claim 2, further comprising preheating both sides of the aggregate, prior to the film pressure-welding.

5. The method according to claim 1, wherein a bulk thickness of the aggregate is 30 μm or more.

6. The method according to claim 1, wherein an average particle size of a filler contained in the resin varnish is 0.1 to 10 μm.

7. The method according to claim 1, wherein the resin film is a thermosetting resin film.

8. The method according to claim 1, wherein the resin varnish has a filler content of 3 vol % or less in a solid content thereof.

9. The method according to claim 1, wherein the resin varnish has a filler content of 2.5 vol % or less in a solid content thereof.

10. The method according to claim 1, wherein the resin varnish has a filler content of 2.0 vol % or less in a solid content thereof.

11. The method according to claim 1, wherein the resin varnish has a filler content of 0.2 vol % or more and 5 vol % or less in a solid content thereof.

12. The method according to claim 1, wherein the resin varnish has a filler content of 0.5 vol % or more and 5 vol % or less in a solid content thereof.

13. The method according to claim 1, wherein the resin varnish has a filler content of 1.0 vol % or more and 5 vol % or less in a solid content thereof.

14. The method according to claim 1, wherein the resin varnish has a filler content of 1.3 vol % or more and 5 vol % or less in a solid content thereof.

15. The method according to claim 1, wherein the resin varnish has a filler content of 0.2 vol % or more and 3 vol % or less in a solid content thereof.

16. The method according to claim 1, wherein the resin varnish has a filler content of 0.2 vol % or more and 2.5 vol % or less in a solid content thereof.

17. The method according to claim 1, wherein the resin varnish has a filler content of 0.2 vol % or more and 2.0 vol % or less in a solid content thereof.

18. The method according to claim 1, wherein an average particle size of a filler contained in the resin varnish is 0.3 to 7 μm.

19. The method according to claim 1, wherein an average particle size of a filler contained in the resin varnish is 0.5 to 5 μm.

* * * * *